(12) United States Patent  
Sotomaru

(10) Patent No.: US 8,086,091 B2  
(45) Date of Patent: Dec. 27, 2011

(54) DATA RECORDING SYSTEM, DATA ACQUIRING APPARATUS, AND RECORDING MEDIUM STORING THEREIN DATA ACQUIRING APPARATUS CONTROL PROGRAM

(75) Inventor: Toshihiro Sotomaru, Saitama (JP)

(73) Assignee: Pioneer Corporation, Tokyo (JP)

( * ) Notice: Subject to any disclaimer, the term of this patent is extended or adjusted under 35 U.S.C. 154(b) by 1126 days.

(21) Appl. No.: 11/887,151

(22) PCT Filed: Mar. 3, 2006

(86) PCT No.: PCT/JP2006/304159  
§ 371 (c)(1),  
(2), (4) Date: Sep. 26, 2007

(87) PCT Pub. No.: WO2006/112176  
PCT Pub. Date: Oct. 26, 2006

(65) Prior Publication Data  
US 2009/0142034 A1    Jun. 4, 2009

(30) Foreign Application Priority Data  
Mar. 31, 2005    (JP) .................................. 2005-104216

(51) Int. Cl.  
*H04N 9/88* (2006.01)  
*H04N 9/885* (2006.01)  
*H04N 5/76* (2006.01)  
*H04N 7/16* (2006.01)  
*H04L 12/28* (2006.01)  
*H04L 12/56* (2006.01)

(52) U.S. Cl. ........ 386/263; 386/264; 386/267; 386/270; 386/299; 386/326; 370/400; 725/45

(58) Field of Classification Search ................... 386/263, 386/264, 267, 270, 299, 326; 370/400; 725/25  
See application file for complete search history.

(56) References Cited

U.S. PATENT DOCUMENTS

| | | | | |
|---|---|---|---|---|
| 7,088,952 | B1 * | 8/2006 | Saito et al. | 455/3.06 |
| 7,881,590 | B2 * | 2/2011 | Yoon et al. | 386/298 |
| 2003/0007785 | A1 * | 1/2003 | Shimizu | 386/117 |
| 2004/0013121 | A1 * | 1/2004 | Higashigawa et al. | 370/400 |
| 2004/0196377 | A1 | 10/2004 | Tikka et al. | |
| 2004/0244032 | A1 * | 12/2004 | Yamada | 725/25 |
| 2006/0161742 | A1 * | 7/2006 | Sugimoto et al. | 711/154 |

FOREIGN PATENT DOCUMENTS

| | | |
|---|---|---|
| JP | 2000-090512 A | 3/2000 |
| JP | 2003-018525 | 1/2003 |
| JP | 2004-056393 A | 2/2004 |
| JP | 2004-222136 A | 8/2004 |
| JP | 2004-229035 A | 8/2004 |
| JP | 2004-328517 A | 11/2004 |
| JP | 2005-506806 A | 3/2005 |
| WO | WO 03/036936 A1 | 5/2003 |

* cited by examiner

*Primary Examiner* — Thai Tran  
*Assistant Examiner* — Daquan Zhao  
(74) *Attorney, Agent, or Firm* — Foley & Lardner LLP

(57) ABSTRACT

A data recording system includes a data acquiring apparatus that acquires data externally and a data recording apparatus that is communicably connected to the data acquiring apparatus via a network, and records data transmitted from the data acquiring apparatus. The data acquiring apparatus includes a data acquiring unit, a temporary storage unit, a transmitting-receiving unit, a communication-band management unit, and a control unit. The data recording apparatus includes a transmitting-receiving unit, a recording unit, and a control unit.

11 Claims, 6 Drawing Sheets

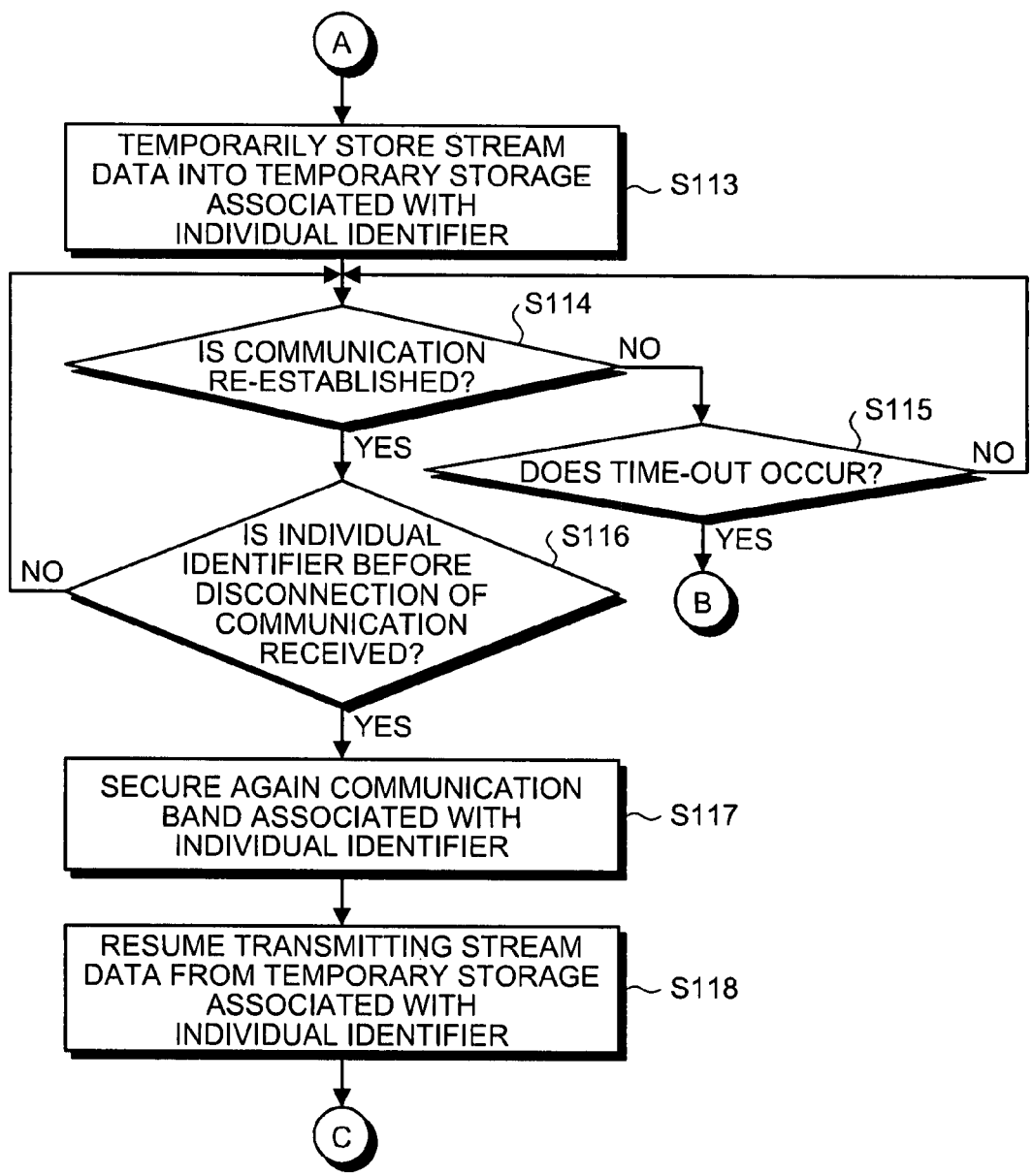

000# DATA RECORDING SYSTEM, DATA ACQUIRING APPARATUS, AND RECORDING MEDIUM STORING THEREIN DATA ACQUIRING APPARATUS CONTROL PROGRAM

TECHNICAL FIELD

The present invention relates to a data recording system, a data acquiring apparatus, and a data-acquiring apparatus control program. Particularly, the present invention relates to a data recording system that has a configuration in which an apparatus for externally acquiring data is connected to an apparatus for recording the data via a network to transmit data via the network, and a data acquiring apparatus, and a data-acquiring apparatus control program, configured to implement the data recording system.

BACKGROUND ART

Recently, audio-visual devices each of which is equipped with a communication interface, such as a wired LAN or a wireless LAN, appear, and a transmission of contents, such as a video image, between the audio-visual devices is under development. Currently, a transmission of contents between such audio-visual devices generally takes an approach with which a device transmits data of saved contents or contents distributed in real time via a network, another device receives the data of the contents, and then the contents are viewed and listened.

On the other hand, a system is developed according to a configuration in which a tuner for receiving airwaves (contents data) and a recorder for saving contents data are installed on different devices, and contents data received by the tuner is transmitted to the recorder via a network.

A technology related to such system is proposed, for example, such that, if a communication band required for video recording cannot be secured at the start time of a programmed video-recording, a communication band for video recording is secured from another device occupying the communication band compulsorily or based on a user's operation (for example, see Patent Document 1).

Patent Document 1: Japanese Patent Application Laid-open No. 2000-90512

DISCLOSURE OF INVENTION

Problem to be Solved by the Invention

However, in the conventional technology described above, it is not assumed that a physical communication connection may be disconnected and resumed during video recording. A device equipped with a tuner and a device quipped with a recorder are connected to each other via a wireless channel or a wired channel. Generally, there is a problem that wireless communication is unreliable due to interference, multipath, or the like, and cannot guarantee the same level of communication quality as wired communication. In other words, for example, in a system of video-recording that transmits contents data from a device equipped with a tuner to a device equipped with a video recorder via a wireless network, video recording may fail due to a problem, such as an interruption in a video image, depending on a communication state in a wireless zone. Such failure in video recording is a fatal problem for an audio-visual device, which has to be avoided by all means. On the other hand, also in wired communication, communication may be disconnected due to breaking of wire, loose-off of a connector, a contact failure, or the like, so that a countermeasure is needed in this case.

However, according to the above technology, a communication band can be secured only within a certain time range predetermined by an operation of a video recording reservation. In other words, there is a problem in the conventional technology described above that, if a physical communication connection is once disconnected, there is no countermeasure and video recording is terminated at that time, so that certain contents cannot be fully video-recorded. The present invention has been made to solve the above problem, and an object of the present invention is to obtain a data recording system, in which a data acquiring apparatus that acquires data externally is communicably connected via a network to a data recording apparatus that records data transmitted from the data acquiring apparatus, and by which certain data can be entirely and reliably recorded even when a physical communication connection is disconnected and then resumed during data recording, and a data acquiring apparatus, and a data-acquiring apparatus control program configured to implement the data recording system.

Means for Solving Problem

A data recording system according to one aspect of the present invention includes a data acquiring apparatus that acquires data externally, and a data recording apparatus that is communicably connected to the data acquiring apparatus via a network, and records data transmitted from the data acquiring apparatus. The data acquiring apparatus includes a data acquiring unit that acquires data externally, a temporary storage unit that temporarily stores therein data acquired by the data acquiring unit at least until communication is resumed, when communication with the data recording apparatus is disconnected, a transmitting-receiving unit that transmits data acquired by the data acquiring unit to the data recording apparatus via the network, and transmits data stored in the temporary storage unit to the data recording apparatus via the network when communication is resumed, a communication-band management unit that secures a communication band for transmitting data acquired by the data acquiring unit to the data recording apparatus, creates communication-band securement information that indicates a communication band secured for the data, confirms that a communication band for transmitting the data acquired by the data acquiring unit to the data recording apparatus is reserved while communication with the data recording apparatus is disconnected, and then secures again the communication band, and a control unit that controls overall processing performed by the data acquiring apparatus. The temporary storage unit temporarily stores therein the data acquired by the data acquiring unit and the communication-band securement information in an associated manner at least until communication is resumed, when communication with the data recording apparatus is disconnected, and the transmitting-receiving unit transmits the data acquired by the data acquiring unit to the data recording apparatus via the network in accordance with the communication-band securement information, and transmits data stored in the temporary storage unit to the data recording apparatus via the network in accordance with the communication-band securement information when the communication is resumed. The data recording apparatus includes a transmitting-receiving unit that receives data transmitted from the data acquiring apparatus, a recording unit that records the data received by the transmitting-receiving unit, and a control unit that controls overall processing performed by the data recording apparatus.

Further, a data acquiring apparatus according to another aspect of the present invention is configured to be communicably connected to a data recording apparatus via a network and to constitute a data recording system that records external data. The data acquiring apparatus includes a data acquiring unit that acquires data externally, a temporary storage unit that temporarily stores therein data acquired by the data acquiring unit at least until communication is resumed, when communication with the data recording apparatus is disconnected, a transmitting-receiving unit that transmits data acquired by the data acquiring unit to the data recording apparatus via the network, and transmits data stored in the temporary storage unit to the data recording apparatus via the network when the communication is resumed, a communication-band management unit that secures a communication band for transmitting data acquired by the data acquiring unit to the data recording apparatus, creates communication-band securement information that indicates a communication band secured for the data, confirms that a communication band for transmitting the data acquired by the data acquiring unit to the data recording apparatus is reserved while communication with the data recording apparatus is disconnected, and then secures again the communication band, and a control unit that controls overall processing performed by the data acquiring apparatus, wherein the temporary storage unit temporarily stores therein the data acquired by the data acquiring unit and the communication-band securement information in an associated manner at least until communication is resumed, when communication with the data recording apparatus is disconnected, and the transmitting-receiving unit transmits the data acquired by the data acquiring unit to the data recording apparatus via the network in accordance with the communication-band securement information, and transmits data stored in the temporary storage unit to the data recording apparatus via the network in accordance with the communication-band securement information when the communication is resumed.

Still further, a computer-readable recording medium according to still another aspect of the present invention that stores therein a computer program for controlling a data acquiring apparatus configured to be communicably connected to a data recording apparatus via a network and to constitute a data recording system that records external data, the computer program causing a computer to execute acquiring data externally, temporarily storing data acquired in the acquiring at least until communication is resumed, when communication with the data recording apparatus is disconnected, transmitting data acquired in the acquiring to the data recording apparatus via the network, and transmitting data stored in the temporarily storing to the data recording apparatus via the network when the communication is resumed, managing a communication-band by securing a communication band for transmitting data acquired in the acquiring to the data recording apparatus, creating communication-band securement information that indicates a communication band secured for the data, confirming that a communication band for transmitting the data acquired in the acquiring to the data recording apparatus is reserved while communication with the data recording apparatus is disconnected, and then securing again the communication band; wherein in the temporarily storing, the data acquired in the acquiring and the communication-band securement information are temporarily stored in an associated manner at least until communication is resumed, when communication with the data recording apparatus is disconnected, and in the transmitting, the data acquired in the acquiring is transmitted to the data recording apparatus via the network in accordance with the communication-band securement information, and the data stored in the temporarily storing is transmitted to the data recording apparatus via the network in accordance with the communication-band securement information when the communication is resumed.

BRIEF DESCRIPTION OF DRAWINGS

FIG. 2B is a flowchart for explaining operation of the stream data transmitter according to the example of the present invention.

EXPLANATIONS OF LETTERS OR NUMERALS

Figure 1:
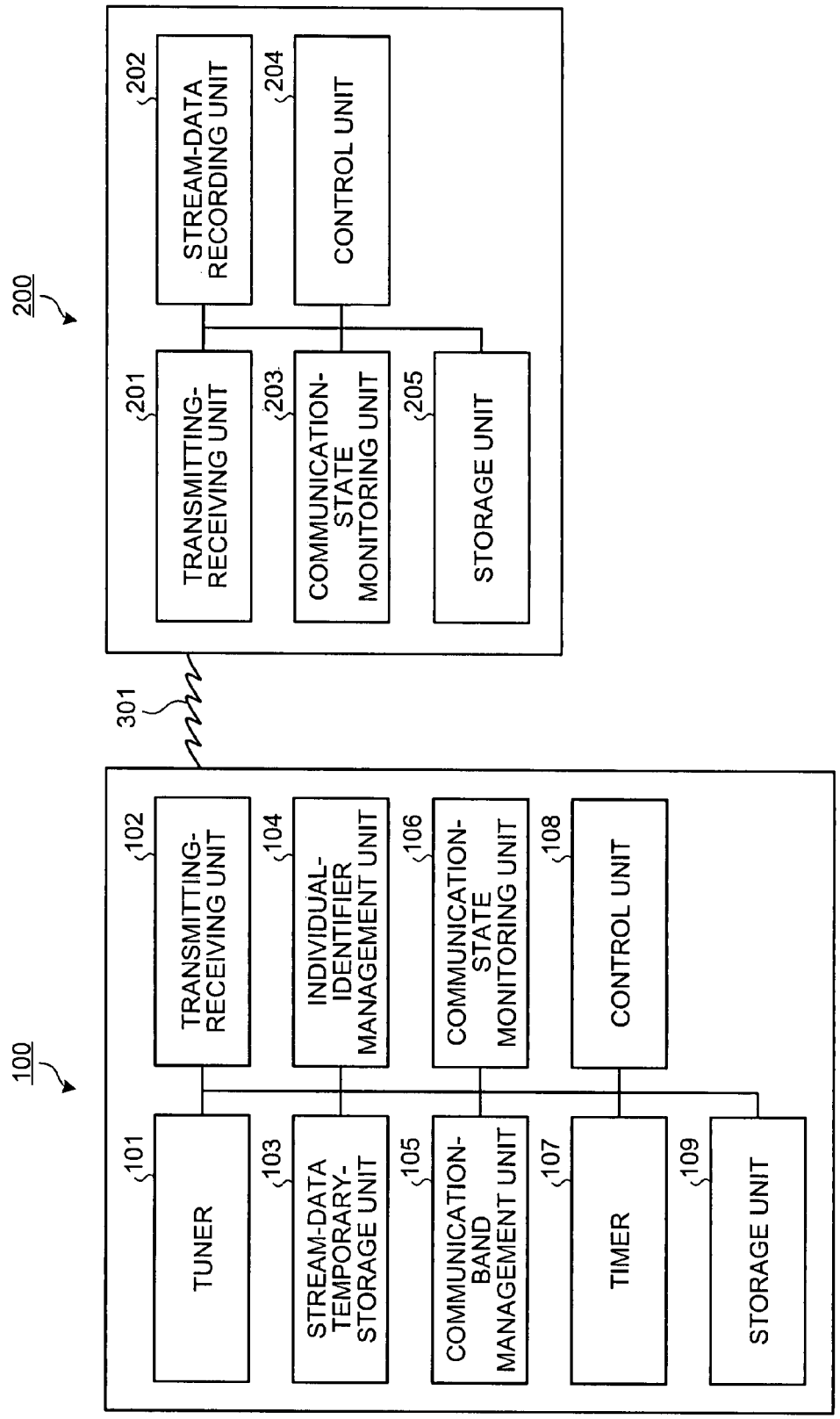
FIG. 1 is a block diagram that depicts a configuration of a data recording system according to an example of the present invention.

100 Stream data transmitter
101 Tuner
102 Transmitting-receiving unit
103 Stream-data temporary-storage unit
104 Individual-identifier management unit
105 Communication-band management unit
106 Communication-state monitoring unit
107 Timer
108 Control unit
109 Storage unit
200 Video recorder
201 Transmitting-receiving unit
202 Stream-data recording unit
203 Communication-state monitoring unit
204 Control unit
205 Storage unit

BEST MODE(S) FOR CARRYING OUT THE INVENTION

A data recording system, a data acquiring apparatus, a data recording apparatus, a data acquiring-apparatus control program, and a data recording-apparatus control program according to an embodiment of the present invention will be explained below.

[Embodiment]

The data recording system according to the embodiment of the present invention is a data recording system configured to include a data acquiring apparatus that acquires data externally, and a data recording apparatus that is communicably connected to the data acquiring apparatus via a network, and records data transmitted from the data acquiring apparatus. The data acquiring apparatus includes a data acquiring unit, an individual-identifier management unit, a communication-band management unit, a temporary storage unit, a transmitting-receiving unit, and a control unit.

In the data acquiring apparatus, the data acquiring unit acquires data externally. The individual-identifier management unit creates and manages an individual identifier that associates data acquired by the data acquiring unit with the data recording apparatus that is a destination of the data, the individual identifier being unique to the data. The communication-band management unit secures a communication band for transmitting the data acquired by the data acquiring unit to the data recording apparatus, and creates and manages communication-band securement information that indicates the communication band secured for the data.

When communication with, the data recording apparatus is disconnected, the temporary storage unit temporarily stores therein the data acquired by the data acquiring unit, the individual identifier, and the communication-band securement information in an associated manner, at least until the communication is resumed. The transmitting-receiving unit transmits the data acquired by the data acquiring unit to the data recording apparatus via the network in accordance with the individual identifier and the communication-band securement information, and transmits the data stored in the temporary storage unit to the data recording apparatus via the network in accordance with the individual identifier and the communication-band securement information when communication is resumed. The control unit controls overall processing performed by the data acquiring apparatus.

The data recording apparatus includes a transmitting-receiving unit, a recording unit, and a control unit. In the data recording apparatus, the transmitting-receiving unit receives the data transmitted from the data acquiring apparatus. The recording unit records the data received by the transmitting-receiving unit and the individual identifier in an associated manner. The control unit controls overall processing performed by the data recording apparatus.

In the data recording system according to the embodiment of the present invention configured as described above, if communication is disconnected during data communication between the data acquiring apparatus and the data recording apparatus, the data acquired by the data acquiring unit, the individual identifier, and the communication-band securement information are temporarily stored in the temporary storage unit in the data acquiring apparatus in an associated manner until the communication is resumed. Moreover, the individual identifier is stored in both of the data acquiring apparatus and the data recording apparatus.

As a result, a logical connection relationship is established based on the individual identifier (one-to-one association between data and a destination of the data (the data recording apparatus)), so that the data can be reliably associated with the data recording apparatus as the destination of the data in accordance with the logical connection relationship, even after a physical communication connection between the data acquiring apparatus and the data recording apparatus is disconnected and then resumed. Accordingly, a plurality of application program can be simultaneously run in the data recording system. The present invention can be applied in a case where identifiers of a transmitter side and a receiver side, which can be referred from an application program, are dynamically assigned, for example, similarly to DHCP (Dynamic Host Configuration Protocol) in IP protocol.

When communication between the data acquiring apparatus and the data recording apparatus is resumed, a communication band for resuming data communication can be reliably secured, because the communication-band securement information is associated with the data. When the communication between the data acquiring apparatus and the data recording apparatus is resumed, the data stored in the temporary storage unit is transmitted to the data recording apparatus via the network in accordance with the individual identifier and the communication-band securement information. Thus, according to the present invention, while recording data, even if a physical communication connection between the data acquiring apparatus and the data recording apparatus is disconnected and then resumed, the data in processing of recording can be reliably associated with the data recording apparatus as the destination of the data regardless of how long or short a disconnection time of the communication connection is, and a required communication band can be secured until the data recording is finished.

For this reason, by the data recording system according to the embodiment of the present invention, in a configuration in which the data acquiring apparatus that acquires data externally and the data recording apparatus that records the data transmitted from the data acquiring unit are communicably connected to each other via the network, certain data can be entirely and reliably recorded, even when the physical communication connection is disconnected and then resumed during data recording.

EXAMPLE

A specific example of a data recording system, a data acquiring apparatus, a data recording apparatus, a data acquiring-apparatus control program, and a data recording-apparatus control program according to the present invention will be explained below in detail with reference to the drawings. The present invention is not limited to the following description, and can be modified as required within a scope not departing from the concept of the present invention.

FIG. 1 is a block diagram that depicts an overall configuration of a stream-data video-recording system according to the embodiment. As shown in FIG. 1, the stream-data video-recording system according to the embodiment includes a stream data transmitter 100, and a video recorder 200, which is connected to and communicable to the stream data transmitter 100 via a wireless channel (wireless LAN) 301. In the stream-data video-recording system, the stream data transmitter 100 receives stream data of certain contents from an external station, such as a transmission base station, and transmits the received stream data to the video recorder 200. The video recorder 200 then receives the stream data transmitted from the stream data transmitter 100, and records (e.g., video-records) the received data.

The stream data transmitter 100 includes a tuner 101, a transmitting-receiving unit 102, a stream-data temporary-storage unit 103, an individual-identifier management unit 104, a communication-band management unit 105, a communication-state monitoring unit 106, a timer 107, a control unit 108, and a storage unit 109.

The tuner 101 is a receiving unit for stream data that receives stream data of certain contents from an external station, such as a transmission base station. The transmitting-receiving unit 102 is a communication unit that communicates with the video recorder 200, and transmits and receives various data required for transmitting stream data. Moreover, the transmitting-receiving unit 102 transmits stream data received by the tuner 101, or stream data stored in the stream-data temporary-storage unit 103, to the video recorder 200 with proper timing.

The stream-data temporary-storage unit 103 is a storage unit that temporarily stores therein the stream data received by the tuner 101. Specifically, if communication between the stream data transmitter 100 and the video recorder 200 is not established or is disconnected due to some reason, before or during a transmission of the stream data to the video recorder 200, despite that the tuner 101 receives stream data, the stream-data temporary-storage unit 103 temporarily stores therein the received stream data.

When storing stream data into the stream-data temporary-storage unit 103 and the video recorder 200, the individual-identifier management unit 104 creates and manages an individual identifier for associating the stream data with a destination of the stream data (the video recorder 200) one-to-one. If communication between the stream data transmitter 100 and the video recorder 200 is not established or is disconnected despite that the tuner 101 receives stream data, the individual-identifier management unit 104 creates an individual identifier for each specific piece (for example, one content) of stream data, and stores the individual identifier together with the stream data into the stream-data temporary-storage unit 103.

The communication-band management unit 105 determines a communication band required for transmitting the stream data received by the tuner 101 to the video recorder 200, and allocates a certain communication band to each specific piece (for example, one content) of stream data. Moreover, the communication-band management unit 105 creates information that indicates a communication band to be allocated to stream data as information associated to the individual identifier (hereinafter, "communication-band securement information"), and stores the created information into the stream-data temporary-storage unit 103 together with the stream data.

The communication-state monitoring unit 106 monitors a communication state with the video recorder 200, and notifies the control unit 108 of a monitored state, for example, when communication with the video recorder 200 is established, when the communication with the video recorder 200 is not established, when the communication with the video recorder 200 is disconnected, and when the communication with the video recorder 200 is resumed after the communication is disconnected. The timer 107 counts a predetermined time when communication with the video recorder 200 is disconnected.

The control unit 108 controls overall processing performed by the stream data transmitter 100. The storage unit 109 stores therein various computer programs to be required when the control unit 108 controls the whole of the stream data transmitter 100.

The video recorder 200 includes a transmitting-receiving unit 201, a stream-data recording unit 202, a communication-state monitoring unit 203, a control unit 204, and a storage unit 205.

The transmitting-receiving unit 201 is a communication unit that communicates with the stream data transmitter 100, and transmits and receives various data required for receiving stream data. Moreover, the transmitting-receiving unit 201 receives the stream data transmitted from the stream data transmitter 100. The stream-data recording unit 202 stores (e.g., video-records) therein the stream data received by the transmitting-receiving unit 201.

The communication-state monitoring unit 203 monitors a communication state with the stream data transmitter 100, and notifies the control unit 204 of a monitored state, for example, when communication with the stream data transmitter 100 is established, when the communication with the stream data transmitter 100 is not established, when the communication with the stream data transmitter 100 is disconnected, and when the communication with the stream data transmitter 100 is resumed after the communication is disconnected.

The control unit 204 controls overall processing performed by the video recorder 200. The storage unit 205 stores therein various computer programs to be required when the control unit 204 controls the whole of the video recorder 200.

Figure 2A:
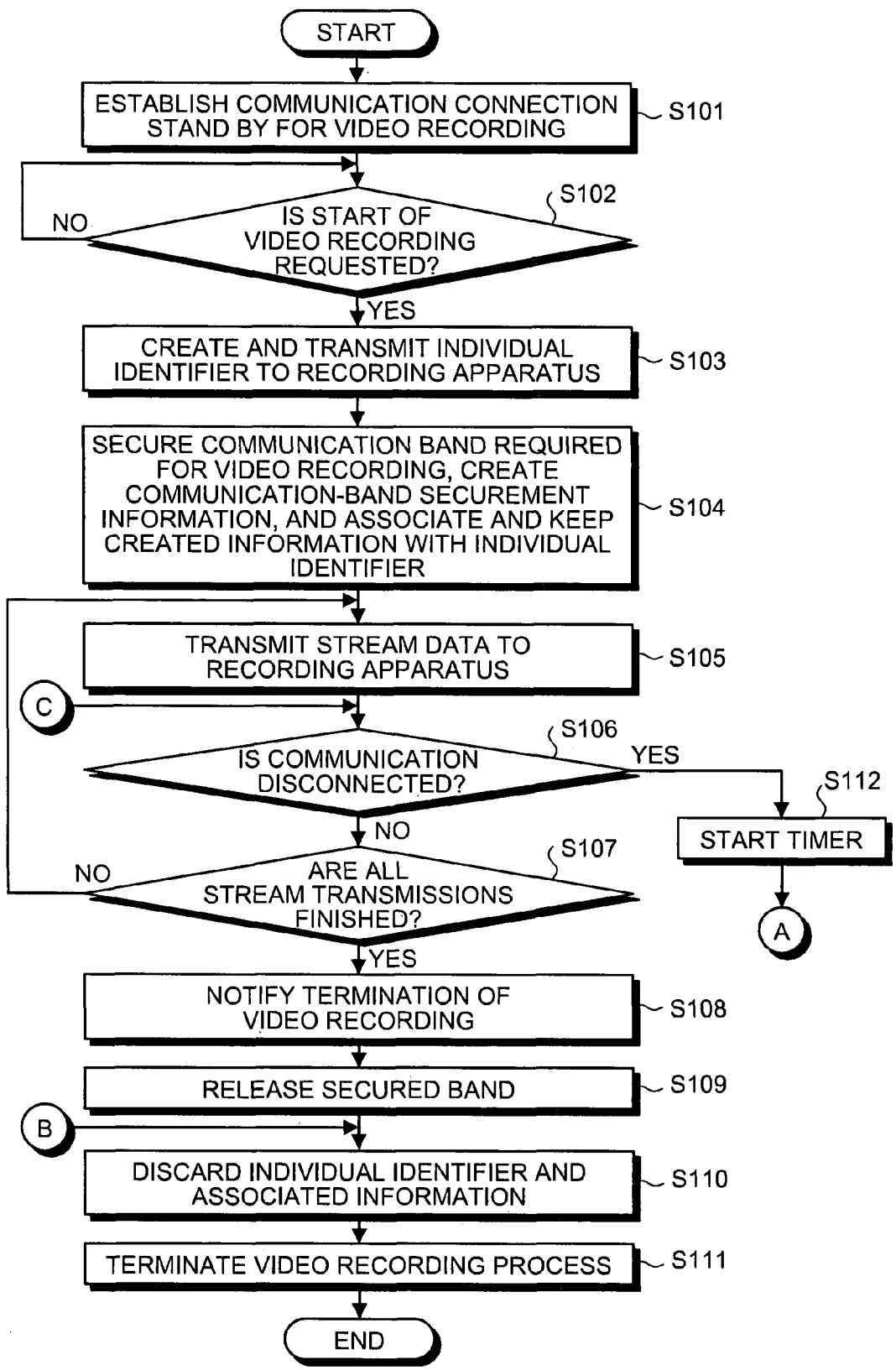
FIG. 2A is a flowchart for explaining operation of a strum data transmitter according to the example of the present invention.
Figure 3:
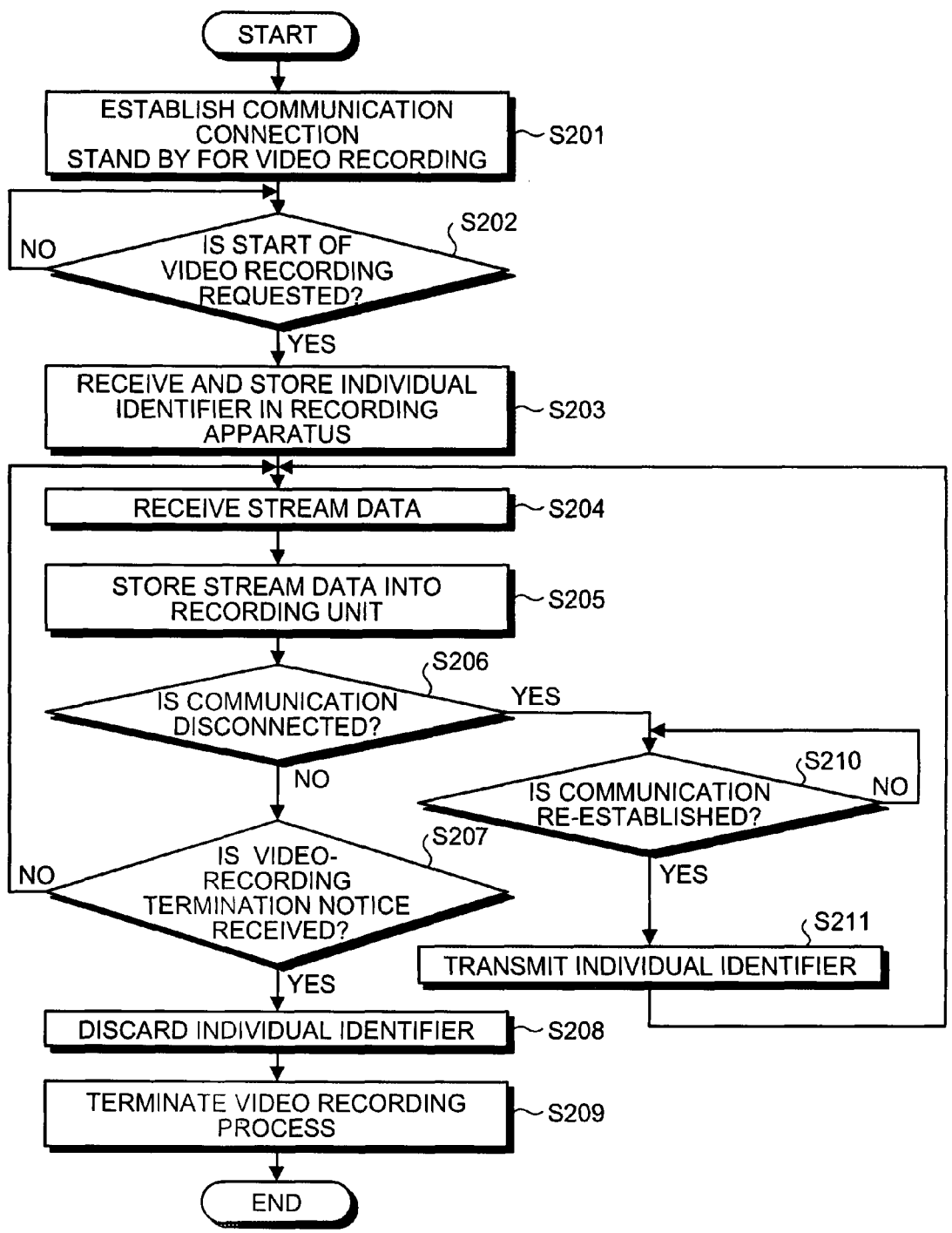
FIG. 3 is a flowchart for explaining operation of a video recorder according to the example of the present invention.

Operations of video recording with the stream-data video-recording system according to the example configured as described above are explained below with reference to FIGS. 2A, 2B, and 3. FIGS. 2A and 2B are a flowchart for explaining the operation of the stream data transmitter 100. FIG. 3 is a flowchart for explaining the operation of the video recorder 200.

To begin with, when the stream data transmitter 100 and the video recorder 200 are powered on, the transmitting-receiving unit 102 in the stream data transmitter 100 and the transmitting-receiving unit 201 in the video recorder 200 establish a communication connection via the wireless LAN 301, and the both apparatuses stand by for video recording (step S101, step S201). In the example, the stream data transmitter 100 and the video recorder 200 communicate with each other in a communication-band guaranteed mode, such as IEEE 802.11e.

The transmitting-receiving unit 102 in the stream data transmitter 100 and the transmitting-receiving unit 201 in the video recorder 200 then check whether a video-recording start request is issued (step S 102, step S202). The video-recording start request is transmitted by either of the stream data transmitter 100 or the video recorder 200 to the other apparatus. If the video-recording start request transmitted from the other apparatus is not received (No at step S102, No at step S202), a video-recording standby mode is maintained, and the issuance of the video-recording start request is continuously checked.

In contrast, if the video-recording start request transmitted from the other apparatus is received (Yes at step S102, Yes at step S202), the both apparatuses start respective video-recording processes in response to the video-recording start request as a trigger. Specifically, in the stream data transmitter 100, the tuner 101 starts receiving stream data of certain contents, and the individual-identifier management unit 104 creates an individual identifier to be given to the stream data subjected to video recording, and transmits the individual identifier to the video recorder 200 (step S103). The individual identifier is an identifier unique to each specific piece (for example, one content) of stream data for associating the stream data with a destination of the stream data (the video recorder 200) one-to-one when storing the stream data into the stream-data temporary-storage unit 103 and the stream-data recording unit 202 in the video recorder 200.

Meanwhile, the video recorder 200 receives the individual identifier transmitted from the stream data transmitter 100, and stores therein the individual identifier (step S203). Thus, the stream data transmitter 100 and the video recorder 200 both store therein the individual identifier, so that stream data can be reliably specified between the stream data transmitter 100 and the video recorder 200, and a logical communication connection (one-to-one association between stream data and a destination of the stream data (the video recorder 200)) is established.

The stream data transmitter 100 then secures a communication band required for feeding the stream data to be video-recorded through the wireless LAN 301. The communication band is secured by the communication-band management unit 105 in the stream data transmitter 100, although manners of securing a communication band vary depending on physical links. Specifically, the communication-band management unit 105 determines a communication band required for transmitting stream data to the video recorder 200, and allocates and secures a certain communication band to each specific piece (for example, one content) of stream data. Moreover, the communication-band management unit 105 creates communication-band securement information as information to be associated with the individual identifier, and stores therein the created information (step S104).

The stream data transmitter 100 then transmits the stream data received by the tuner 101 to the video recorder 200 with the transmitting-receiving unit 102 via the wireless LAN 301 (step S105). The video recorder 200 performs video recording as the transmitting-receiving unit 201 receives the stream data transmitted by the stream data transmitter 100 (step S204), and as the stream data recording unit 202 stores therein the stream data (step S205).

The stream data transmitter 100 and the video recorder 200 then monitor a communication state with the communication-state monitoring unit 106 and the communication-state monitoring unit 203 during a transmission of the stream data, and determine whether a disconnection of the communication occurs (step S106, step S206).

If it is determined that the communication is not disconnected (No at step S106, No at step S206), the stream data transmitter 100 determines whether the transmitting-receiving unit 102 finishes all transmissions of the stream data (step S107). If the stream data transmitter 100 determines that the transmissions of the stream data are not all finished (No at step S107), the stream data transmitter 100 goes back to step S105, and continues transmitting the stream data.

In contrast, if the stream data transmitter 100 determines that all of the transmissions of the stream data are finished (Yes at step S106), the stream data transmitter 100 transmits a video-recording termination notice for reporting the termination of the video recording to the video recorder 200 (step S108), and releases the communication band secured for transmitting the stream data (step S109). The stream data transmitter 100 then discards the individual identifier given to the stream data having been transmitted, and information associated with the individual identifier (step S110). Accordingly, the stream data transmitter 100 exits from the logical communication connection, and terminates a series of video recording processes (step S111). Here, the information associated with the individual identifier includes information, for example, communication-band securement information, and association information between the stream-data temporary-storage unit 103 and the individual identifier.

On the other hand, if the video recorder 200 determines that the communication is not disconnected according to a determination at step S206 (No at step S206), the video recorder 200 checks whether the video recorder 200 receives a video-recording termination notice (step S207). If the video recorder 200 does not receive the video-recording termination notice (No at step S207), the video recorder 200 goes back to step S204, and continues receiving the stream data. In contrast, if the video recorder 200 receives the video-recording termination notice (Yes at step S207), the stream data transmitter 100 releases the communication band secured for transmitting the stream data, then, the video recorder 200 discards the individual identifier stored therein (step S208) and terminates a series of the video recording processes (step S209).

Returning to step S106, if it is determined that the communication is disconnected (Yes at step S206), the stream data transmitter 100 starts the timer 107 for counting time after the communication is disconnected, and counts a predetermined time (step S112). If a time-out occurs in the timer 107, the stream data transmitter 100 determines that resumption of the communication cannot be expected.

The stream data transmitter 100 then temporarily stores into the stream-data temporary-storage unit 103 the stream data that is received by the tuner 101 but cannot be transmitted to the video recorder 200 (step S113). Thus, the stream data received by the tuner 101 during the disconnection of the communication can be temporarily saved without discarding. When the stream data is temporarily saved, the stream data is associated with the individual identifier and the communication-band securement information.

The stream data transmitter 100 then checks with the communication-state monitoring unit 106 whether the communication with the video recorder 200 is re-established (step S114). If the communication is not re-established (No at step S114), the stream data transmitter 100 checks whether a time-out occurs in the count of the timer 107 (step S115). If a time-out does not occur in the count of the timer 107 (No at step S115), the stream data transmitter 100 goes back to step S114, and repeats checking establishment of the communication.

In contrast, if the communication between the stream data transmitter 100 and the video recorder 200 is not re-established yet, and a time-out occurs in the count of the timer 107 (Yes at step S115), the stream data transmitter 100 abandons resumption of the video recording process, going to step S110, and executes a termination process of video recording. At the same time, the stream data transmitter 100 discards the individual identifier, the associated information, and also the stream data stored in the stream-data temporary-storage unit 103, at step S110.

On the other hand, looking back at step S206, if it is determined that the communication is disconnected (Yes at step S206), the video recorder 200 checks with the communication-state monitoring unit 203 whether the communication is re-established (step S210). If the communication is not re-established (No at step S210), the video recorder 200 repeats checking re-establishment of the communication. In contrast, if the communication is re-established (Yes at step S210), the video recorder 200 transmits the individual identifier of the stream data received before the communication is disconnected, to the stream data transmitter 100 (step S211).

Returning to step S114, if the communication is established (Yes at step S114), the stream data transmitter 100 checks whether the stream data transmitter 100 receives the individual identifier transmitted from the video recorder 200 to which the stream data is transmitted before the disconnection, and checks the logical communication connection (step S116). In other words, by confirming that the individual identifier stored in the stream data transmitter 100 is identical to the received individual identifier, the stream data transmitter 100 confirms that a device with which communication is established is the video recorder 200 to which the stream data is to be transmitted, consequently the logical communication connection is resumed.

If the stream data transmitter 100 receives the individual identifier (Yes at step S116), the stream data transmitter 100 secures again the communication band associated with the individual identifier (step S117). When securing, the stream data transmitter 100 secures again the communication band based on a confirmation that an information communication band for the logical communication connection is reserved with reference to the communication-band securement information associated with the individual identifier. Moreover, the stream data transmitter 100 stops the timer 107.

The stream data transmitter 100 then transmits the stream data associated with the individual identifier stored in the stream-data temporary-storage unit 103 to the video recorder 200 in sequence (step S118). Going to step S106, the stream data transmitter 100 then continues the series of the video recording processes.

Here, if the tuner 101 has not finished receiving the stream data, the stream data received by the tuner 101 is temporarily stored in the stream-data temporary-storage unit 103.

If a speed of transmitting the stream data stored in the stream-data temporary-storage unit 103 to the video recorder 200 is faster than a speed of storing stream data received by the tuner 101 into the stream-data temporary-storage unit 103, the stream data stored in the stream-data temporary-storage unit 103 is gradually decreased, and all transmitted to the video recorder 200. When no stored stream data is left in the stream-data temporary-storage unit 103, the stream data received by the tuner 101 is directly transmitted to the video recorder 200 without being stored in the stream-data temporary-storage unit 103.

In contrast, if a speed of transmitting the stream data stored in the stream-data temporary-storage unit 103 to the video recorder 200 is slower than a speed of storing the stream data received by the tuner 101 into the stream-data temporary-storage unit 103, all of the stream data received by the tuner 101 after a transmission of the stream data is resumed is once stored in the stream-data temporary-storage unit 103, and then transmitted to the video recorder 200.

In either case, because the stream data stored in the stream-data temporary-storage unit 103 and the stream data received by the tuner 101 after the resumption of the transmission are all transmitted to the video recorder 200, no stream data is discarded even when communication is disconnected, so that certain stream data can be all transmitted to the video recorder 200 and video-recorded.

Returning to step S116, if the stream data transmitter 100 does not receive the individual identifier transmitted from the video recorder 200 to which the stream data is transmitted before the disconnection (No at step S116), the stream data transmitter 100 determines that the established communication is a connection to another video recorder 200 or a terminal connected to the wireless LAN 301 for use in other than video recording, then goes back to step S114, and repeats checking re-establishment of the communication.

However, if any extra communication band is available, it is possible to transmit stream data while allocating a communication band to the other video recorder 200 with which communication is established. If the other device present in the wireless LAN 301 requests a communication band while the communication between the stream data transmitter 100 and the video recorder 200 is disconnected, the stream data transmitter 100 refers to communication-band securement information. A portion of communication bands obtained by removing the reserved communication band from currently obtainable communication bands is a communication band that can be secured for the other device. Therefore, if a request from the other device is within a range that can be secured, a communication band is allocated to the other device; but if a request from the other device is beyond a range that can be secured, the request for communication band from the other device is discarded.

As described above, in the stream-data video-recording system according to the example, if communication is disconnected while stream data is being transmitted from the stream data transmitter 100 to the video recorder 200, the stream data received by the tuner 101 is associated with an individual identifier and communication-band securement information, and then stored in the stream-data temporary-storage unit 103 in the stream data transmitter 100, at least until the communication is resumed. When the communication between the stream data transmitter 100 and the video recorder 200 is re-established, because the individual identifier is associated with the stream data, the stream data stored in the stream-data temporary-storage unit 103 can be reliably associated with the video recorder 200 as the transmission destination of the stream data, consequently the logical communication connection can be resumed.

Moreover, when the communication between the stream data transmitter 100 and the video recorder 200 is re-established, because the communication-band securement information is associated with the stream data, a communication band for resuming a transmission of the stream data can be reliably secured. When the communication between the stream data transmitter 100 and the video recorder 200 is then resumed, the stream data stored in the stream-data temporary-storage unit 103 is transmitted to the video recorder 200 via the network in accordance with the individual identifier and the communication-band securement information.

Thus, according to the example, while recording stream data, even if a physical communication connection between the stream data transmitter 100 and the video recorder 200 is disconnected and then resumed, the stream data in processing of video recording can be reliably associated with the video recorder 200 as the transmission destination of the stream data regardless of how long or short a disconnection time of the communication connection is, and a required communication band can be secured until video recording of the stream data recording is finished.

For this reason, by the stream-data video-recording system according to the example, in a configuration in which the stream data transmitter 100 and the video recorder 200 that video-records stream data transmitted from the stream data transmitter 100 are communicably connected to each other via the wireless LAN 301, even when the physical communication connection is disconnected and then resumed while recording the stream data, the logical communication connection can be resumed, a communication band can be secured again, and certain stream data can be entirely and reliably recorded without temporal restriction.

Figure 4:
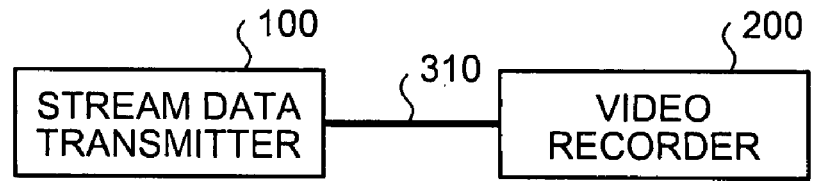
FIG. 4 is a block diagram that depicts another configuration example of the data recording system according to the present invention.

Although the above description explains a case where the stream data transmitter 100 is connected to and communicates with the video recorder 200 via the wireless LAN 301, the manner of connection according to the present invention of the stream data transmitter 100 and the video recorder 200 is not limited thereto. For example, as shown in FIG. 4, a configuration such that the stream data transmitter 100 is connected to and communicates with the video recorder 200 via a wired LAN 310 is feasible. In a case of such configuration, the above-described effects of the present invention can also be obtained.

Figure 5:
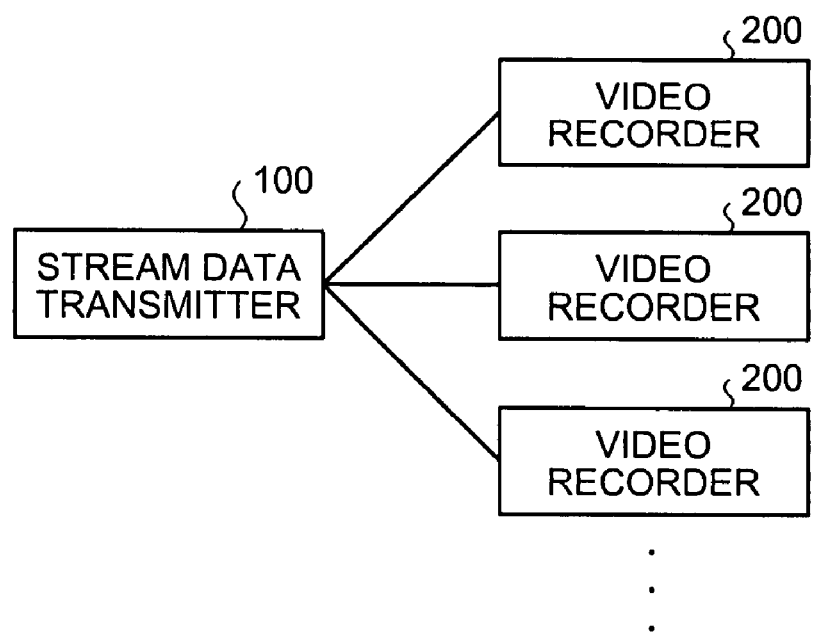
FIG. 5 is a block diagram that depicts still another configuration example of the data recording system according to the present invention.

Although the above description explains a configuration in which a single device of the stream data transmitter 100 is connected to a single device of the video recorder 200, in the present invention, the combination of the stream data transmitter 100 and the video recorder 200 is not limited thereto. For example, as shown in FIG. 5, a configuration in which a single device of the stream data transmitter 100 is connected to a plurality of the video recorders 200 is feasible.

Figure 6:
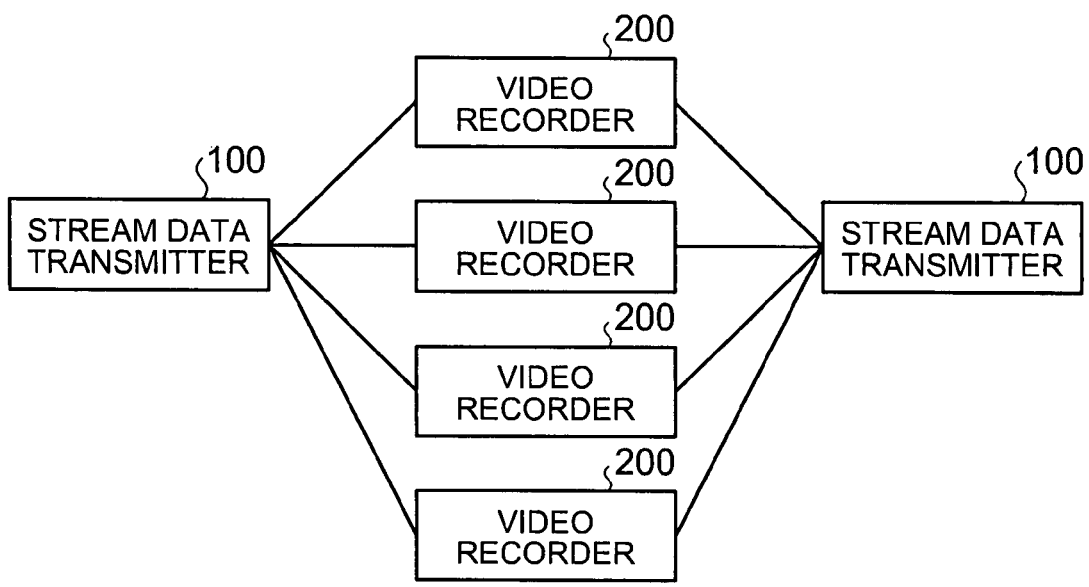
FIG. 6 is a block diagram that depicts still another configuration example of the data recording system according to the present invention.

Alternatively, as shown in FIG. 6, a configuration in which a plurality of the stream data transmitters 100 are connected to a plurality of the video recorders 200 is feasible. Even in such case, the stream data transmitters 100 and the video recorders 200 can be connected in any manner such as by a wireless LAN or by a wired LAN. In a case of such configuration, the above-described effects of the present invention can also be obtained.

Figure 7:
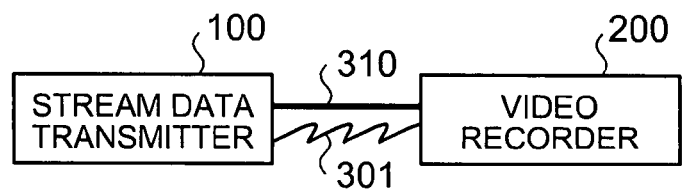
FIG. 7 is a block diagram that depicts still another configuration example of the data recording system according to the present invention.

Although the above description explains a configuration in which the stream data transmitter 100 is connected to the video recorder 200 via a single channel (wireless LAN), in the present invention, the connection configuration between the stream data transmitter 100 and the video recorder 200 is not limited to this. For example, as shown in FIG. 7, a configuration is feasible, in which a single device of the stream data transmitter 100 is connected to a single device of the video recorder 200 via a plurality of channels, and a channel of performing communication can be switched as required. FIG. 7 depicts a configuration in which a single device of the stream data transmitter 100 is connected to a single device of the video recorder 200 via two channels, namely, the wired LAN 310 and the wireless LAN 301.

In this case, for example, communication, i.e., a transmission of stream data, is performed usually via the wired LAN 310, but if the communication by the wired channel is disconnected due to some reasons during the transmission of the stream data, the communication can be switched to the wireless LAN 301, and the transmission of the stream data can be continued. When switching the communication channel, the stream-data video-recording system uses the same individual identifier as used in the communication via the wired channel. Accordingly, the stream data is accurately associated with the video recorder 200 even after the communication channel is switched from the wired LAN 310 to the wireless LAN 301, so that the stream data can be transmitted and video-recorded without problem.

Furthermore, in a case of a configuration in which a single device of the stream data transmitter 100 is connected to a single device of the video recorder 200 via a plurality of channels, by reserving (securing) communication bands for a plurality of channels, a transmission of stream data can be immediately and reliably continued when the communication channel is switched. For example, as shown in FIG. 7, when stream data is transmitted in a state where a single device of the stream data transmitter 100 is connected to a single device of the video recorder 200 via two channels, namely, the wired LAN 310 and the wireless LAN 301, by reserving (securing) communication bands for the both channels, the wired LAN 310 and the wireless LAN 301, a transmission of stream data can be immediately and reliably continued when the communication channel is switched.

The video-recording processes performed by the stream data transmitter 100 and the video recorder 200 as explained in the above example can be implemented by a stream-data transmitter control program and a video-recorder control program which execute the above processes. The stream-data transmitter control program and the video-recorder control program according to the present invention can be executed by a computer that includes, as a hardware configuration, a ROM that stores therein computer programs for executing various processing, a CPU that executes processing related to video recording in accordance with computer programs in the ROM, a RAM in which a workarea is formed and various data required for controlling video-recording processes is stored, and a bus that connects the units to each other.

Although the above description explains video-recording processes as an example, the present invention is not limited to image data, but also can be applied for recording various stream data, such as audio data.

The invention claimed is:

1. A data recording system comprising:
a data acquiring apparatus that acquires data externally; and
a data recording apparatus that is communicably connected to the data acquiring apparatus via a network, and records data transmitted from the data acquiring apparatus,
wherein the data acquiring apparatus includes:
a data acquiring unit that acquires data externally;
a temporary storage unit that temporarily stores therein the data acquired by the data acquiring unit at least until communication is resumed, when communication with the data recording apparatus is disconnected;
a transmitting-receiving unit that transmits the data acquired by the data acquiring unit to the data recording apparatus via the network, and transmits the data stored in the temporary storage unit to the data recording apparatus via the network when communication is resumed;
a communication-band management unit that secures a communication band for transmitting data acquired by the data acquiring unit to the data recording apparatus, creates communication-band securement information that indicates the communication band secured for the data, confirms that the communication band for transmitting the data acquired by the data acquiring unit to the data recording apparatus is reserved while communication with the data recording apparatus is disconnected, and then secures again the communication band when communication is resumed; and
a control unit that controls overall processing performed by the data acquiring apparatus,
wherein the temporary storage unit temporarily stores therein the data acquired by the data acquiring unit and the communication-band securement information in an associated manner at least until communication is resumed, when communication with the data recording apparatus is disconnected, and
wherein the transmitting-receiving unit transmits the data acquired by the data acquiring unit to the data recording apparatus via the network in accordance with the communication-band securement information, and transmits the data stored in the temporary storage unit to the data recording apparatus via the network in accordance with the communication-band securement information when the communication is resumed, and
wherein the data recording apparatus includes:
a transmitting-receiving unit that receives the data transmitted from the data acquiring apparatus;
a recording unit that records the data received by the transmitting-receiving unit; and
a control unit that controls overall processing performed by the data recording apparatus.

2. The data recording system according to claim 1, wherein, if a third device present in the network makes a request for a communication band while communication between the data acquiring apparatus and the data recording apparatus is disconnected, the communication-band management unit compares a requested communication band requested by the third device with a securable communication band that is left securable for the third device after the communication band for transmitting the data acquired by the data acquiring unit to the data recording apparatus is removed from communication bands obtainable for the data acquiring apparatus, and, if the requested communication band is within the securable communication band, the communication-band management unit allocates the securable communication band to the third device, whereas, if the requested band is beyond the securable communication band, the request for the communication band from the third device is discarded.

3. The data recording system according to claim 1, further comprising an individual-identifier management unit that creates and manages an individual identifier unique to data acquired by the data acquiring unit, the individual identifier associating the acquired data with recording processing perfoimed by the data recording apparatus that is a destination of the acquired data,
   wherein, when communication with the data recording apparatus is disconnected, the temporary storage unit temporarily stores therein data acquired by the data acquiring unit and the individual identifier in an associated manner at least until the communication is resumed, and
   wherein the transmitting-receiving unit transmits the data acquired by the data acquiring unit to the data recording apparatus via the network in accordance with the individual identifier, and transmits data stored in the temporary storage unit to the data recording apparatus via the network in accordance with the individual identifier when communication is resumed.

4. The data recording system according to claim 1, wherein the data is stream data.

5. A data acquiring apparatus configured to be communicably connected to a data recording apparatus via a network and to constitute a data recording system that records external data, the data acquiring apparatus comprising:
   a data acquiring unit that acquires data externally;
   a temporary storage unit that temporarily stores therein the data acquired by the data acquiring unit at least until communication is resumed, when communication with the data recording apparatus is disconnected;
   a transmitting-receiving unit that transmits the data acquired by the data acquiring unit to the data recording apparatus via the network, and transmits the data stored in the temporary storage unit to the data recording apparatus via the network when the communication is resumed;
   a communication-band management unit that secures a communication band for transmitting data acquired by the data acquiring unit to the data recording apparatus, creates communication-band securement information that indicates the communication band secured for the data, confirms that the communication band for transmitting the data acquired by the data acquiring unit to the data recording apparatus is reserved while communication with the data recording apparatus is disconnected, and then secures again the communication band when communication is resumed; and
   a control unit that controls overall processing performed by the data acquiring apparatus, wherein
   the temporary storage unit temporarily stores therein the data acquired by the data acquiring unit and the communication-band securement information in an associated manner at least until communication is resumed, when communication with the data recording apparatus is disconnected, and
   the transmitting-receiving unit transmits the data acquired by the data acquiring unit to the data recording apparatus via the network in accordance with the communication-band securement information, and transmits the data stored in the temporary storage unit to the data recording apparatus via the network in accordance with the communication-band securement information when the communication is resumed.

6. The data acquiring apparatus according to claim 5, wherein, if a third device present in the network makes a request for a communication band while communication between the data acquiring apparatus and the data recording apparatus is disconnected, the communication-band management unit compares a requested communication band requested by the third device with a securable communication band that is left securable for the third device after the communication band for transmitting the data acquired by the data acquiring unit to the data recording apparatus is removed from communication bands obtainable for the data acquiring apparatus, and, if the requested communication band is within the securable communication band, the communication-band management unit allocates the securable communication band to the third device, whereas, if the requested band is beyond the securable communication band, the request for the communication band from the third device is discarded.

7. The data acquiring apparatus according to claim 5, further comprising an individual-identifier management unit that creates and manages an individual identifier unique to data acquired by the data acquiring unit, the individual identifier associating the acquired data with recording processing performed by the data recording apparatus that is a destination of the acquired data,
   wherein, when communication with the data recording apparatus is disconnected, the temporary storage unit temporarily stores therein data acquired by the data acquiring unit and the individual identifier in an associated manner at least until the communication is resumed, and
   wherein the transmitting-receiving unit transmits the data acquired by the data acquiring unit to the data recording apparatus via the network in accordance with the individual identifier, and transmits the data stored in the temporary storage unit to the data recording apparatus via the network in accordance with the individual identifier when communication is resumed.

8. The data acquiring apparatus according to claim 5, wherein the data is stream data.

9. A non-transitory computer-readable recording medium that stores therein a computer program for controlling a data acquiring apparatus configured to be communicably connected to a data recording apparatus via a network and to constitute a data recording system that records external data, the computer program causing a computer to execute:
   acquiring data externally;
   temporarily storing the data acquired in the acquiring at least until communication is resumed, when communication with the data recording apparatus is disconnected;
   transmitting the data acquired in the acquiring to the data recording apparatus via the network, and transmitting the data stored in the temporarily storing to the data recording apparatus via the network when the communication is resumed;
   managing a communication-band by securing a communication band for transmitting data acquired in the acquiring to the data recording apparatus, creating communication-band securement information that indicates the communication band secured for the data, confirming that the communication band for transmitting the data acquired in the acquiring to the data recording apparatus is reserved while communication with the data recording apparatus is disconnected, and then securing again the communication band when communication is resumed;

wherein, in the temporarily storing, the data acquired in the acquiring and the communication-band securement information are temporarily stored in an associated manner at least until communication is resumed, when communication with the data recording apparatus is disconnected, and wherein, in the transmitting, the data acquired in the acquiring is transmitted to the data recording apparatus via the network in accordance with the communication-band securement information, and the data stored in the temporarily storing is transmitted to the data recording apparatus via the network in accordance with the communication-band securement information when the communication is resumed.

10. The non-transitory computer-readable recording medium according to claim 9, wherein if a third device present in the network makes a request for a communication band while communication between the data acquiring apparatus and the data recording apparatus is disconnected, the communication-band management compares a requested communication band requested by the third device with a securable communication band that is left securable for the third device after the communication band for transmitting the data acquired by the data acquiring to the data recording apparatus is removed from communication bands obtainable for the data acquiring apparatus, and, if the requested communication band is within the securable communication band, the securable communication band is allocated to the third device, whereas, if the requested band is beyond the securable communication band, the request for the communication band from the third device is discarded.

11. The non-transitory computer-readable recording medium according to claim 9, wherein the computer program further causes the computer to execute:

managing an individual identifier by creating and managing an individual identifier unique to data acquired in the acquiring, the individual identifier associating the acquired data with recording processing performed by the data recording apparatus that is a destination of the acquired data, wherein, in the temporarily storing, when communication with the data recording apparatus is disconnected, data acquired in the acquiring and the individual identifier are temporarily stored in an associated manner at least until the communication is resumed, and wherein, in the transmitting, the data acquired in the acquiring is transmitted to the data recording apparatus via the network in accordance with the individual identifier, and the data stored in the temporarily storing is transmitted to the data recording apparatus via the network in accordance with the individual identifier when the communication is resumed.

* * * * *